US008155529B2

(12) United States Patent
Rhee et al.

(10) Patent No.: US 8,155,529 B2
(45) Date of Patent: Apr. 10, 2012

(54) FORWARD DISCRETE/INVERSE-DISCRETE FOURIER TRANSFORM DEVICE AND METHOD FOR OPTICAL OFDM COMMUNICATION AND TRANSMITTING AND RECEIVING APPARATUS COMPRISING THE DEVICE

(75) Inventors: June Koo Rhee, Daejeon (KR); Kyu Sang Lee, Seoul (KR); Chan T. D. Thai, An Giang (VN)

(73) Assignee: ICU Research and Industrial Cooperation Group, Daejeon (KR)

( * ) Notice: Subject to any disclaimer, the term of this patent is extended or adjusted under 35 U.S.C. 154(b) by 664 days.

(21) Appl. No.: 12/347,162

(22) Filed: Dec. 31, 2008

(65) Prior Publication Data

US 2009/0180778 A1    Jul. 16, 2009

(30) Foreign Application Priority Data

Jan. 4, 2008   (KR) .................. 10-2008-0001467
Sep. 8, 2008   (KR) .................. 10-2008-0088400

(51) Int. Cl.
*H04B 10/00*    (2006.01)
(52) U.S. Cl. .................. 398/140; 398/187; 398/188

(58) Field of Classification Search .................. 398/140, 398/152, 161, 187, 188
See application file for complete search history.

(56) References Cited

U.S. PATENT DOCUMENTS

| | | | | |
|---|---|---|---|---|
| 2003/0026201 A1* | 2/2003 | Arnesen | .................. | 370/210 |
| 2004/0252632 A1* | 12/2004 | Bourdoux et al. | ............ | 370/210 |
| 2007/0043982 A1* | 2/2007 | Arivoli et al. | .................. | 714/701 |
| 2009/0201796 A1* | 8/2009 | Roberts et al. | ................ | 370/210 |

\* cited by examiner

*Primary Examiner* — Dzung Tran
(74) *Attorney, Agent, or Firm* — The Webb Law Firm

(57) ABSTRACT

Disclosed are a forward discrete/inverse-discrete Fourier transform device and method for optical orthogonal frequency division multiplexing (OFDM) communication and a transmitting and receiving apparatus. The forward inverse-discrete Fourier transform device includes N 1:N splitters for splitting subcarrier signals received from N inputs corresponding to the number of optical frequencies of subcarriers, a phase shift delay array module for shifting phases of the split signals from the 1:N splitters, N N:1 power couplers for coupling signals output from the phase shift delay array module, a time delay array module for performing time delay on optical OFDM symbols from the N:1 power couplers, and an N:1 power coupler for coupling signals output from the time delay array module.

7 Claims, 10 Drawing Sheets

FORWARD DISCRETE/INVERSE-DISCRETE FOURIER TRANSFORM DEVICE AND METHOD FOR OPTICAL OFDM COMMUNICATION AND TRANSMITTING AND RECEIVING APPARATUS COMPRISING THE DEVICE

CROSS-REFERENCE TO RELATED APPLICATION

This application claims priority to and the benefit of Korean Patent Application Nos. 10-2008-0001467 filed on Jan. 4, 2008, and 10-2008-0088400 filed Sep. 9, 2008, the disclosures of which are incorporated herein by reference in their entirety.

BACKGROUND

1. Field of the Invention

The present invention relates to a forward discrete/inverse-discrete Fourier transform device and method for optical orthogonal frequency division multiplexing (OFDM) communication and a transmitting and receiving apparatus comprising the device, and more particularly, to a forward discrete/inverse-discrete Fourier transform device and method for optical OFDM communication that enable a transmitting stage of an optical OFDM communication system to optically produce optical OFDM symbols and a receiving stage to demultiplex the symbols, and a transmitting and receiving apparatus comprising the device.

2. Discussion of Related Art

In general, a fast Fourier Transform (FFT) is an algorithm for use in digital signal processing to convert N sample points in a time domain into a corresponding N sample points in a frequency domain.

Orthogonal frequency division multiplexing (OFDM) refers to a multi-carrier scheme for splitting data into several data, modulating the data, and transmitting the modulated data in parallel. Subcarriers are obtained using a discrete Fourier transform (DFT) device.

FIG. 1 is a block diagram illustrating a conventional system for producing and processing OFDM symbols in a conventional optical communication system.

Referring to FIG. 1, an OFDM symbol is produced by an electronic inverse FFT: The inverse FFT is used to multiplex low-rate data with a multi-carrier defined as an orthogonal frequency component.

In a receiver, a photodetector converts a received optical OFDM symbol into a corresponding electrical waveform for an electronic FFT. A result of performing the FFT provides data transmitted with each carrier.

However, a conventional system requires a process of converting an electric signal into an optical signal and then the optical signal into the electric signal in order to process and produce OFDM symbols. This limits performance of an optical communication system.

SUMMARY OF THE INVENTION

The present invention is directed to a forward discrete/inverse-discrete Fourier transform device and method for optical OFDM communication which enable a transmitting stage in an optical OFDM communication system to optically produce optical OFDM symbols and a receiving stage to demultiplex the symbols, instead of using an electronic fast Fourier transform (FFT) requiring photoelectric conversion of signals to produce and process optical OFDM symbols, and a transmitting and receiving apparatus comprising the device.

The present invention is also directed to a forward discrete/inverse-discrete Fourier transform device and method for optical OFDM communication that have a higher spectral efficiency than a conventional optical communication system, and a transmitting and receiving apparatus comprising the device.

According to an aspect of the present invention, there is provided a forward inverse-discrete Fourier transform device for optical orthogonal frequency division multiplexing (OFDM) communication, the device including: N 1:N splitters for splitting subcarrier signals received from N inputs corresponding to the number of optical frequencies of subcarriers; a phase shift delay array module for shifting phases of the split signals from the 1:N splitters; N N:1 power couplers for coupling signals output from the phase shift delay array module; a time delay array module for performing time delay on optical OFDM symbols from the N:1 power couplers; and an N:1 power coupler for coupling signals output from the time delay array module.

According to another aspect of the present invention, there is provided a forward discrete Fourier transform device for optical OFDM communication, the device including: a 1:N splitter for splitting an input optical OFDM symbol into N signals; a time delay array module for performing time delay on the signals from the 1:N splitter; N 1:N splatters for splitting signals output from the time delay array module; a phase shift delay array module for shifting phases of split signals from the 1:N splitters; and N N:1 power couplers for coupling signals output from the phase shift delay array module.

According to still another aspect of the present invention, there is provided a transmitting apparatus for optical data communication in an optical OFDM system, the apparatus comprising: a pulse carver for outputting optical data having a specific optical spectrum and pulse width; a 1:N splitter for splitting the optical data output from the pulse carver into N optical data; N modulators for modulating the optical data from the 1:N splitter by loading the optical data on subcarriers; and a forward inverse-discrete Fourier transform device for optically performing inverse-discrete Fourier transform on the subcarrier optical data from the modulators to produce optical OFDM symbols.

Here, the apparatus may further include: a de-serializer for receiving a serially input optical OFDM modulation signal, converting the optical OFDM modulation signal into parallel signals, and outputting the parallel signals to each modulator.

The apparatus may further include: a pre-emphasis control module connected between the 1:N splitter and each modulator for differently adjusting phases and amplitudes of the subcarriers to equalize performance of the subcarriers.

The spectrum of the pulse output from the pulse carver may have a Gaussian shape.

The forward inverse-discrete Fourier transform device may include: N 1:N splitters for splitting subcarrier signals received from N inputs corresponding to the number of optical frequencies of subcarriers; a phase shift delay array module for shifting phases of the split signals from the 1:N splitters; N N:1 power couplers for coupling signals output from the phase shift delay array module; a time delay array module for performing time delay on optical OFDM symbols from the N:1 power couplers; and an N:1 power coupler for coupling signals output from the time delay array module.

According to yet another aspect of the present invention, there is provided a receiving apparatus for optical data communication in an optical OFDM system, the apparatus including: a forward discrete Fourier transform device for optically performing discrete Fourier transform on input optical OFDM symbols to demultiplex the symbols; N pulse carvers for receiving the demultiplexed optical OFDM symbols from the forward discrete Fourier transform device and outputting parallel optical data having a specific optical spectrum and pulse width; N photodiodes for converting the parallel optical data output from the pulse carvers into electric data; and a serializer for receiving the parallel electric data from the photodiodes and converting the parallel electric data into single serial data.

Here, the forward discrete Fourier transform device may include: a 1:N splitter for splitting an input optical OFDM symbol into N signals; a time delay array module for performing time delay on the signals from the 1:N splitter; N 1:N splitters for splitting signals output from the time delay array module; a phase shift delay array module for shifting phases of split signals from the 1:N splitters; and N N:1 power couplers for coupling signals output from the phase shift delay array module.

The spectrum of the pulse output from each pulse carver may have a Gaussian shape.

According to yet another aspect of the present invention, there is provided a transmitting and receiving apparatus for optical data communication in an optical OFDM system, the apparatus including: a first pulse carver for outputting optical data having a specific optical spectrum and pulse width; a 1:N splitter for splitting the optical data output from the first pulse carver into N optical data; N modulators for modulating the optical data from the 1:N splitter by loading the optical data on subcarriers; a forward inverse-discrete Fourier transform device for optically performing inverse-discrete Fourier transform on subcarrier optical data from the modulators to produce optical OFDM symbols; a forward discrete Fourier transform device for optically performing discrete Fourier transform on the optical OFDM symbols produced by the forward inverse-discrete Fourier transform device to demultiplex the symbols; N second pulse carvers for receiving the demultiplexed optical OFDM symbols from the forward discrete Fourier transform device and outputting optical data having a specific optical spectrum and pulse width in parallel; N photodiodes for converting the optical data output in parallel from the second pulse carvers into electric data; and a serializer for receiving the parallel electric data from the photodiodes and converting the parallel electric data into single serial data.

Here, the apparatus may further include: a de-serializer for receiving a serially input optical OFDM modulation signal, converting the optical OFDM modulation signal into parallel signals, and outputting the parallel signals to each modulator.

The apparatus may further include: a pre-emphasis control module connected between the 1:N splitter and each modulator for differently adjusting phases and amplitudes of the subcarriers to equalize performance of the subcarriers.

The apparatus may further include: an optical bandpass filter connected between the forward inverse-discrete Fourier transform device and the forward discrete Fourier transform device for removing an unnecessary spectrum from the optical OFDM symbols produced by the forward inverse-discrete Fourier transform device.

The spectrum of the pulse output from the first and second pulse carvers may have a Gaussian shape.

The forward inverse-discrete Fourier transform device may include: N 1:N splitters for splitting subcarrier signals received from N inputs corresponding to the number of optical frequencies of subcarriers; a phase shift delay array module for shifting phases of the split signals from the 1:N splitters; N N:1 power couplers for coupling signals output from the phase shift delay array module; a time delay array module for performing time delay on optical OFDM symbols from the N:1 power couplers; and an N:1 power coupler for coupling signals output from the time delay array module.

The forward discrete Fourier transform device may include: a 1:N splitter for splitting an input optical OFDM symbol into N signals; a time delay array module for performing time delay on the signals from the 1:N splitter; N 1:N splitters for splitting signals output from the time delay array module; a phase shift delay array module for shifting phases of split signals from the 1:N splitters; and N N:1 power couplers for coupling signals output from the phase shift delay array module.

According to yet another aspect of the present invention, there is provided a forward inverse-discrete Fourier transform method for optical OFDM communication, the method comprising: (a) 1:N-splitting subcarrier signals received from N inputs corresponding to the number of optical frequencies of subcarriers; (b) shifting phases of the 1:N-split signals and outputting the resultant signals; (c) N:1-coupling the signals output in step (b); (d) performing time delay on an optical OFDM symbol N:1-coupled in step (c) and outputting resultant signals; and (e) N:1-coupling the signals output in step (d).

According to yet another aspect of the present invention, there is provided a forward discrete Fourier transform method for optical OFDM communication, the method comprising: (a') splitting an input optical OFDM symbol into N signals; (b') performing time delay on the N signals and outputting resultant signals; (c') 1:N-splitting the signals output in step (b'); (d') shifting phases of the signals 1:N-split in step (c') and outputting phase-shifted signals; and (e') N:1-coupling the signals output in step (d').

According to the forward discrete/inverse-discrete Fourier transform device and method for optical orthogonal frequency division multiplexing (OFDM) communication and a transmitting and receiving apparatus comprising the device of the present invention as described above, a need for conversion of an optical wavelength to an electric wavelength and conversion of an electric wavelength to an optical wavelength required by a conventional fast Fourier transform (FFT) is eliminated, and fast optical transmission above a speed limit of electronic components and optoelectronic components can be achieved by optical OFDM transmission. For example, the use of a transmitter and a receiver for 4×25 Gbps optical data communication can reduce a bandwidth of electronic components and optoelectronic components necessary for 100 Gbps OFDM to about 25 Gbps.

Furthermore, according to the present invention, the optical OFDM 4×25 Gbps transmission system has a higher spectral efficiency than an amplified transmission 100 Gbps return to zero (RZ) transmission system.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Figure 1:
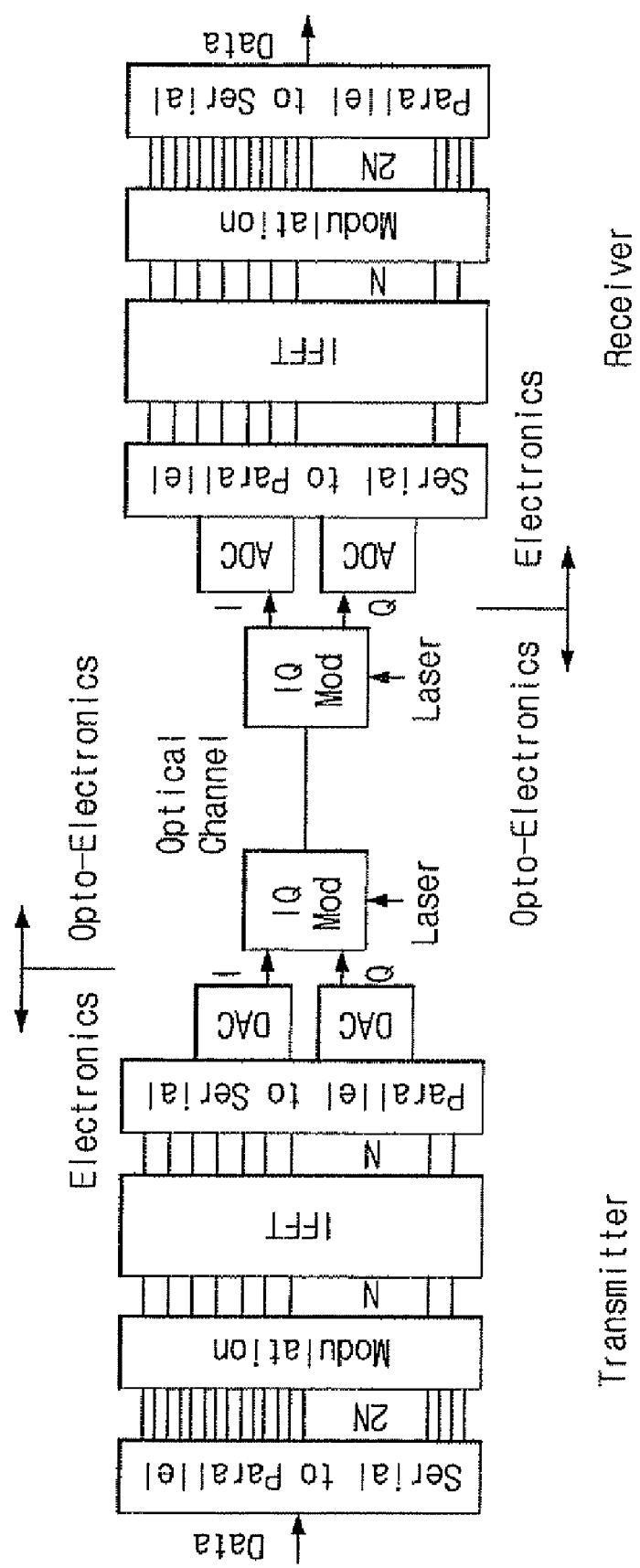
FIG. 1 is a block diagram illustrating a conventional system for producing and processing OFDM symbols in a conventional optical communication system.
Figure 2:
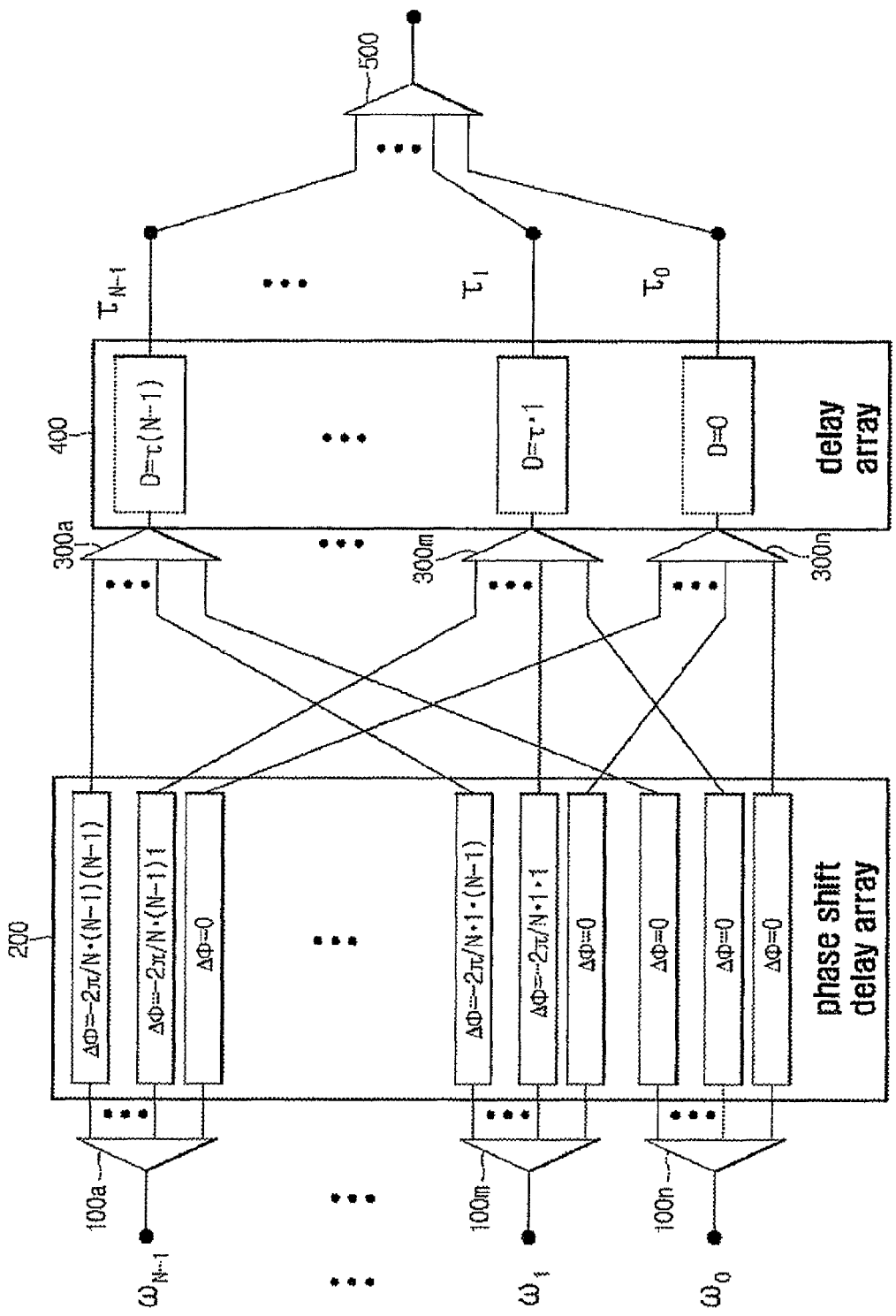
FIG. 2 is a conceptual diagram for explaining a forward inverse-discrete Fourier transform device according to an exemplary embodiment of the present invention.

FIG. 2 is a conceptual diagram for explaining a forward inverse-discrete Fourier transform device according to an exemplary embodiment of the present invention.

Referring to FIG. 2, the forward inverse-discrete Fourier transform device according to an exemplary embodiment of the present invention includes N 1:N splitters 100a to 100n, a phase shift delay array module 200, N N:1 power couplers 300a to 300n, a time delay array module 400, and an N:1 power coupler 500.

Here, the N 1:N splitters 300a to 100n split respective subcarrier signals received from N inputs corresponding to the number of optical frequencies of subcarriers.

The phase shift delay array module 200 shifts phases of the split signals from the 1:N splitters 100a to 100n.

The N N:1 power couplers 300a to 300n couple the signals output from the phase shift delay array module 200.

The time delay array module 400 performs time delay on the coupled optical OFDM symbols from the N:1 power couplers 300a to 300n.

The N:1 power coupler 500 couples the signals output from the time delay array module 400.

Meanwhile, according to an exemplary embodiment of the present invention, the power coupler or splitter may be applied together.

N-point inverse discrete Fourier transform (DFT) is defined by Equation 1:

$$\varepsilon_m = \sum_{k=0}^{N-1} E_k e^{-i\frac{2\pi}{N}km} \quad \text{Equation 1}$$

where $\varepsilon_m$ denotes an $m^{th}$ sample in a time domain.

N-point DFT is defined by Equation 2:

$$E_k = \frac{1}{N}\sum_{m=0}^{N-1} \varepsilon_m e^{i\frac{2\pi}{N}mk} \quad \text{Equation 2}$$

where $E_k$ denotes a $k^{th}$ sample in a frequency domain. An integer N denotes a total number of samples, in which k and m are equal to or greater than 0 and smaller than N ($0 \leq k, m < N$). Corresponding time and frequency positions are defined by Equations 3 and 4:

$$t_m = m\tau \quad \text{Equation 3}$$

$$\omega_k = k\delta \quad \text{Equation 4}$$

where $\tau$ and $\delta$ denote sampling spaces in time and frequency domains and are defined by Equation 5:

$$\delta\tau = 2\Pi/N \quad \text{Equation 5}$$

$\omega_k$ is an input signal of an optical circuit, i.e., the forward inverse-discrete Fourier transform device and denotes an optical frequency of a subcarrier. The optical circuit is implemented by phase delay through optical path length adjustments due to a combination of split powers from the power coupler or splitter, as shown in FIG. 2.

The circuit has an entire configuration similar to a typical wavelength division multiplexer except for moderate time delay and relative phase tuning for each path.

Accordingly, all wavelength components corresponding to carriers for OFDM are orthogonally multiplexed at one output port, and only one optical subcarrier matching a frequency on an input port has constructive interference on the output port. On the other hand, all other subcarriers have destructive interference on the output port.

Figure 3A:
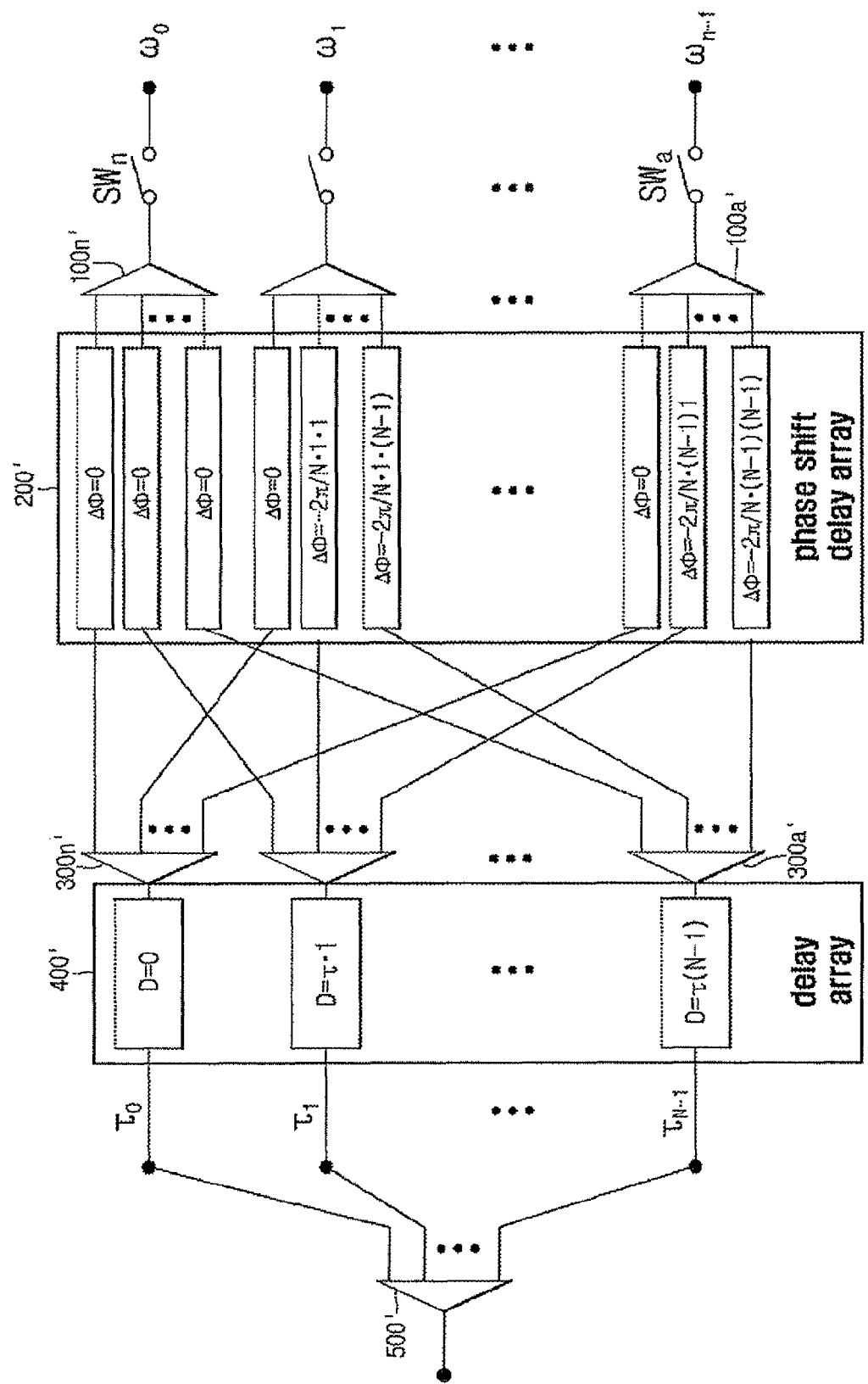
FIG. 3a is a conceptual diagram for explaining a forward discrete Fourier transform device according to an exemplary embodiment of the present invention.
Figure 3B:
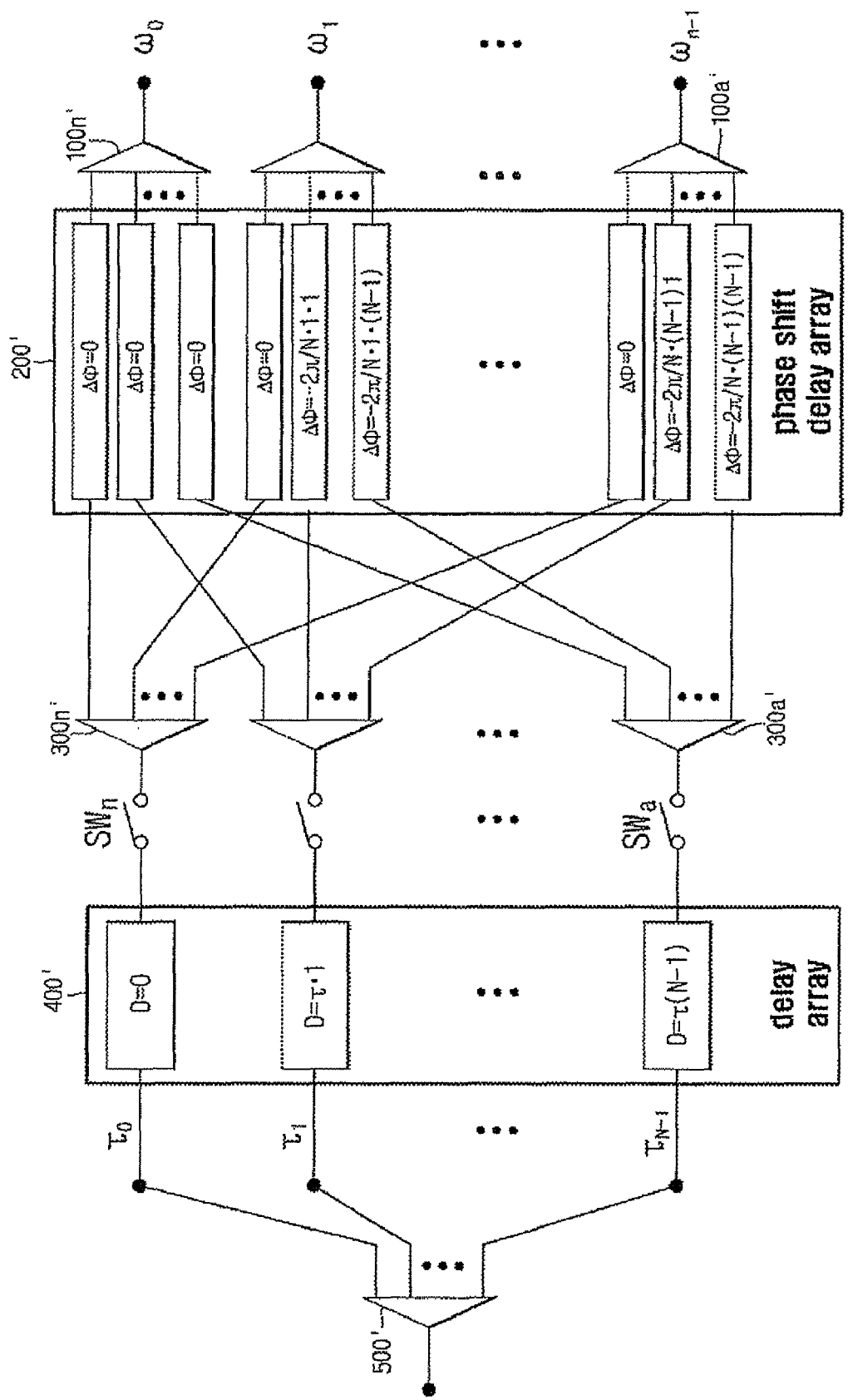
FIG. 3b is a conceptual diagram for explaining a forward discrete Fourier transform device according to an exemplary embodiment of the present invention.

FIGS. 3a and 3b are conceptual diagrams for explaining a forward discrete Fourier transform device according to an exemplary embodiment of the present invention.

The forward discrete Fourier transform (DFT) device according to an exemplary embodiment of the present invention may be also configured as described above. The forward DFT device has retro-propagation invariant that requires a negative phase shift direction and an opposite delay from a forward inverse DFT device, except for phase conjugation.

Referring to FIG. 3a, the forward DFT device of the present invention may include a 1:N splitter 500' for splitting an input optical OFDM symbol into N signals, a time delay array module 400' for performing time delay on the signals from the 1:N splitter 500', N 1:N splitters 300a' to 300n' for splitting signals output from the time delay array module 400', a phase shift delay array module 200' for shifting phases of the split signals from the respective 1:N splitters 300a' to 300n', and N N:1 power couplers 100a' to 100n' for coupling the signals output from the phase shift delay array module 200'. Signal detection switches SWa to SWn are connected between the N:1 power couplers 100a' to 100n' and an output and turn on when a signal is detected. The switches may be included in the forward DFT device.

Referring to FIG. 3b, the forward DFT device of the present invention may include a 1:N splitter 500' for splitting an input optical OFDM symbol into N signals, a time delay array module 400' for performing time delay on the split signals from the 1:N splitter 500', signal detection switches SWa to SWn connected to an output of the time delay array module 400' and switched on when a signal is detected, N 1:N power splitters 300a' to 300n' for splitting signals output via the switches SWa to SWn, a phase shift delay array module 200' for shifting phases of split signals from the 1:N splitters 300a' to 300n', and N N:1 power couplers 100a' to 100n' for coupling the signals output from the phase shift delay array module 200'.

Preferably, a detection pulse used in the switches SWa to SWn may have a similar pulse width with an input time domain sampling space τ.

Meanwhile, an input to the forward inverse-DFT device is produced through laser pulses having a similar pulse width with the time domain sampling space τ. This is for obtaining a deterministic relative phase relationship between different optical carrier frequency inputs.

Accordingly, a chromatic dispersion crosstalk correction scheme and a nonlinear crosstalk correction scheme may be available through known OFDM signal optimization schemes, such as pre-emphasis and power equalization.

Figure 4:
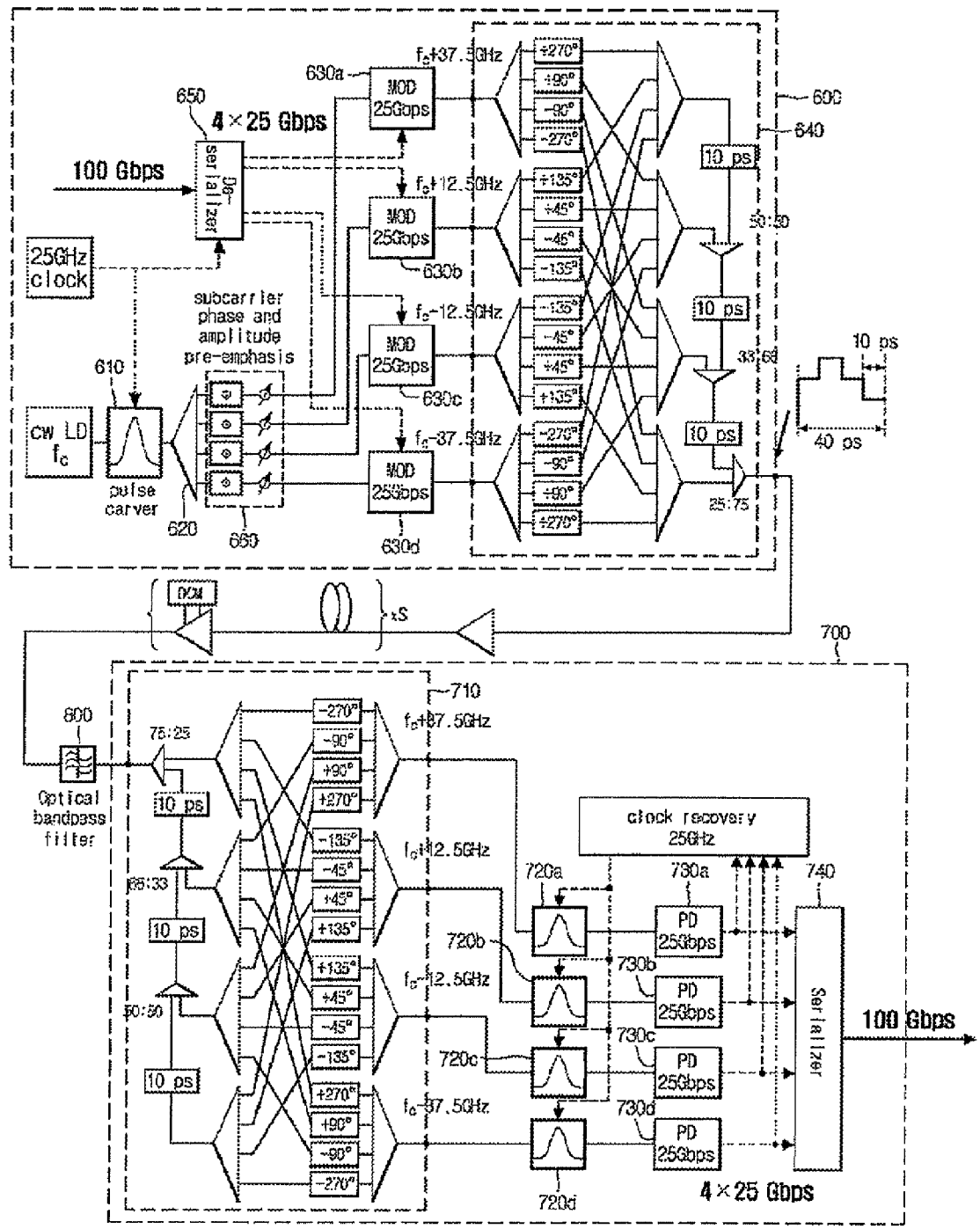
FIG. 4 is a conceptual diagram for explaining a transmitting and receiving apparatus for optical OFDM communication according to an exemplary embodiment of the present invention.

FIG. 4 is a conceptual diagram for explaining a transmitting and receiving apparatus for optical OFDM communication according to an exemplary embodiment of the present invention, which is a 100 Gbps transmission application using the forward discrete/inverse-discrete Fourier transform devices of the present invention as described above.

Referring to FIG. 4, a transmitting and receiving apparatus for optical OFDM communication, i.e., a 100 Gbps transmission system according to an exemplary embodiment of the present invention includes a transmitter 600 and a receiver 700 for 4×25 Gbps communication.

The transmitter 600 includes a pulse carver 610, a 1:N splitter 620, N (N=4) modulators (MOD) 630a to 630d, and a forward inverse-discrete Fourier transform device 640.

The pulse carver 610 outputs optical data having a specific optical spectrum and pulse width. For example, a pulse carver using a continuous-wave (cw) laser diode (LD) and an electro-absorption modulator generates a short pulse with an optical spectrum having 3-dB full width at 160 GHz and a 2.8 ps 3-dB width. Preferably, the pulse spectrum has a Gaussian shape having a sufficiently large bandwidth for a practical application model.

The 1:N splitter 620 or power coupler splits the optical data output from the pulse carver 610 into N optical data (N=4).

The N modulators 630a to 630d modulate the split optical data from the 1:N splitter 620 by loading the data on a subcarrier.

The forward inverse-discrete Fourier transform device 640 optically performs inverse DFT on the modulated subcarrier optical data from the modulators 630a to 630d to produce optical OFDM symbols. For details of the forward inverse-discrete Fourier transform device 640, refer to FIG. 2.

In the transmitter 600 configured as described above, the output pulses are input to the four 25 Gbps modulators 630a to 630d via the 1:N splitter 620 or the power coupler, and the modulated pulse data is input to a carrier input port of the forward inverse-discrete Fourier transform device 640.

Meanwhile, phase shifts in the optical DFT are referenced by a midpoint frequency of the optical carrier rather than the lowest optical subcarrier. The midpoint frequency of the optical carrier is defined as $f_c$, which corresponds to a wavelength of the cw laser diode LD.

The apparatus may further include a de-serializer 650 for receiving a serial optical OFDM modulation signal (100 Gbps), converting the signal into parallel signals, and outputting the parallel signals to the respective modulators 630a to 630d.

The apparatus may further include a pre-emphasis control module 660 connected between the 1:N splitter 629 and the modulators 630a to 630d for differently adjusting the phases and amplitudes of the subcarriers to equalize performance of the subcarriers.

The receiver 700 includes a forward discrete Fourier transform device 710 for optically performing a discrete Fourier transform on the input optical OFDM symbols to demultiplex the symbols, N (N=4) pulse carvers 720a to 720d for receiving the demultiplexed optical OFDM symbols from the forward discrete Fourier transform device 710 and outputting optical data having a specific optical spectrum and pulse width in parallel, N (N=4) photodiodes (PD) 730a to 730d for converting the optical data output in parallel from the pulse carvers 720a to 720d into electric data, and a serializer 740 for receiving the electric data from the photodiodes 730a to 730d in parallel and converting the electric data into single serial data.

The apparatus may further include an optical bandpass filter 800 connected between the forward inverse-discrete Fourier transform device 640 and the forward discrete Fourier transform device 710 for removing an unnecessary spectrum from the optical OFDM symbols produced by the forward inverse-discrete Fourier transform device 640.

Figure 5A:
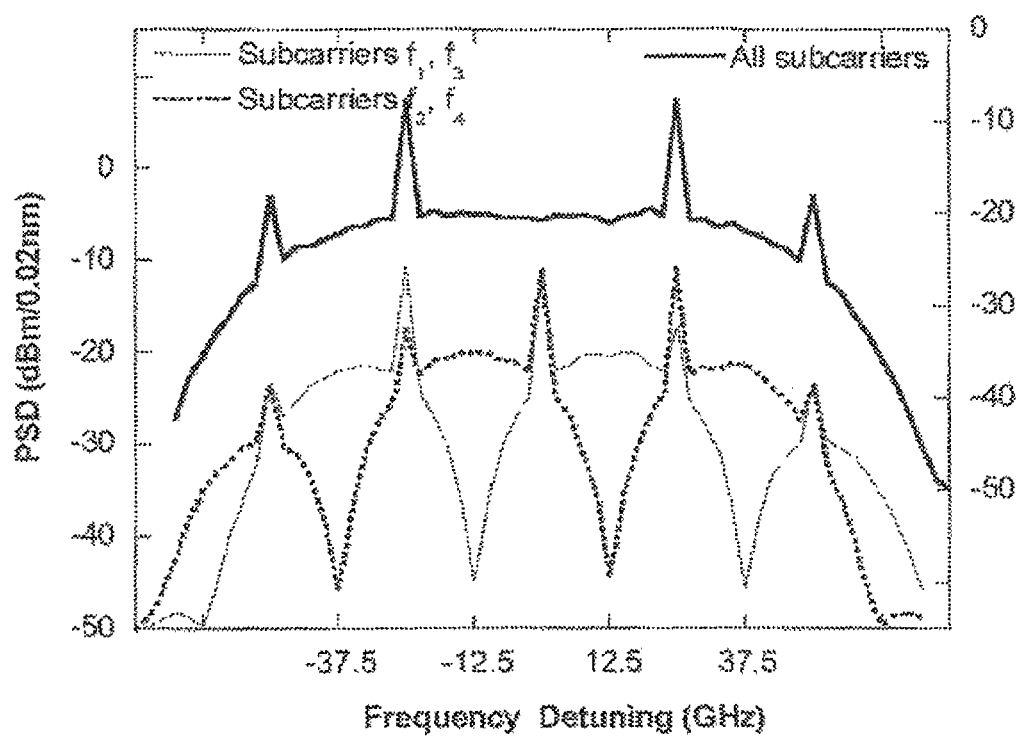
FIG. 5a is a graph showing power spectral density in an optical OFDM transmission system according to an exemplary embodiment of the present invention.

FIG. 5a is a graph showing power spectral density in the optical OFDM transmission system according to an exemplary embodiment of the present invention. The power spectral density is a power spectral density of an optical carrier frequency in a structure of the transmitter 600 for optical OFDM communication of FIG. 4.

Referring to FIGS. 4 and 5a, the power spectral density in the structure of the OFDM transmitter 600 has impulses at a 25 GHz middle of each optical carrier frequency. An upper solid curve represents output power spectral density of a typical OFDM transmitter.

In this example, positions of tones are not consistent with positions of the subcarriers, and any tones indicated by data of power spectral density shown in a lower part are modulated for data information.

That is, the curves indicated by thick and thin dotted lines represent power spectral densities when odd channel frequencies $f_1$ and $f_3$ or even channel frequencies $f_2$ and $f_4$ are selectively multiplexed, respectively. $f_1$, $f_2$, $f_3$, and $f_4$ are subcarrier detuning frequencies at −37.5, −12.5, +12.5, and 37.5 GHz, respectively.

In this example, use of all the subcarriers suppresses the optical carrier in the forward inverse-DFT device 640. An output of the forward inverse-DFT device 640 is input to the optical bandpass filter 800 in order to remove an unnecessary spectrum. An example of a function of the filter is a fourth-order super Gaussian with a 3-dB full width of 160 GHz.

Figure 5B:
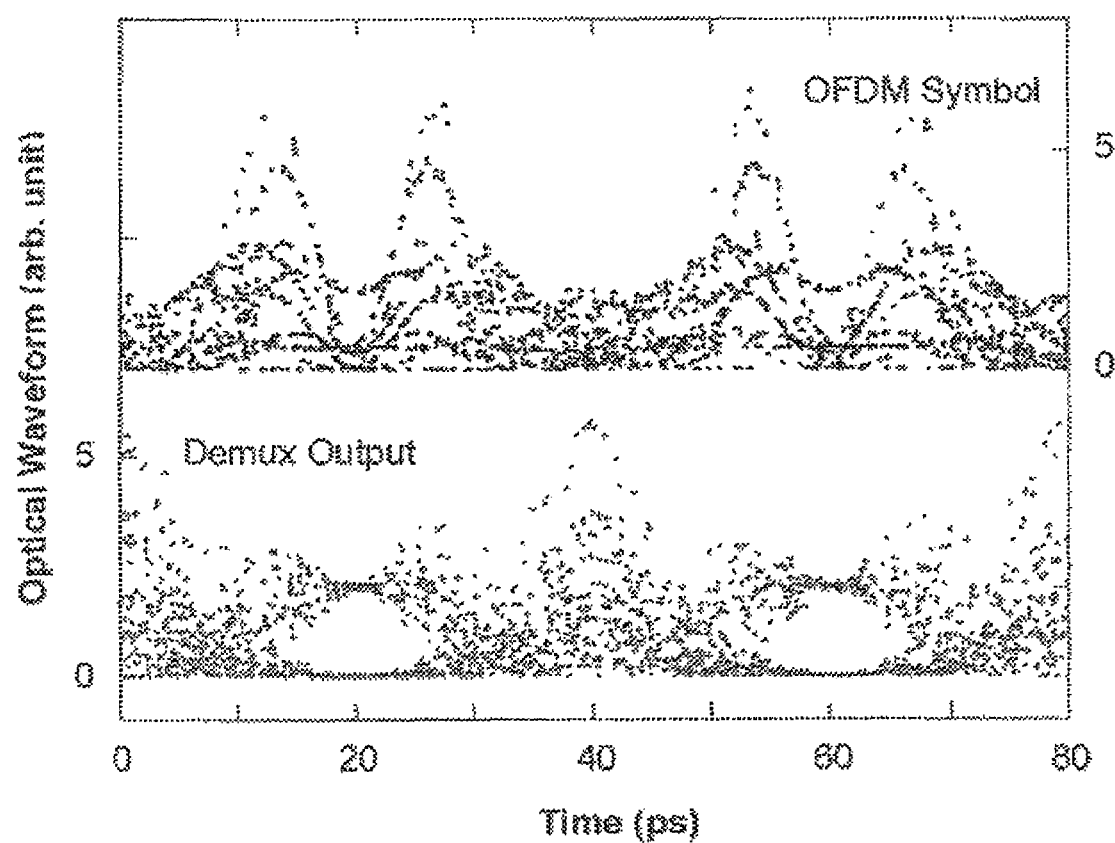
FIG. 5b is a graph showing an optical waveform in an optical OFDM transmission system according to an exemplary embodiment of the present invention.

FIG. 5b is a graph showing an optical waveform in the optical OFDM transmission system according to an exemplary embodiment of the present invention.

Referring to FIGS. 4 and 5b, an upper waveform represents the optical OFDM symbol output from the inverse DFT device 640. FIG. 5b shows overlapping of a variety of data modulations, in which the optical OFDM symbol has a symbol period of 40 ps, but consists of 10-ps features.

A pulse splitter, i.e., the pre-emphasis control module 660 connected between the 1:N splitter 620 and the forward inverse-DFT device 640 may differently adjust the phases and amplitudes of the subcarriers so that performance of the subcarriers can be equalized in the receiver 700.

In one example of the pre-emphasis in the model of the transmitter 600, pre-emphasis values of {−1.3, −1, +1, +1.3} were selected for subcarrier detuning frequencies $f_1$, $f_2$, $f_3$, and $f_4$, respectively. These values equalize performance of the receiver 700 from optical amplifier noise and subcarrier crosstalk penalty.

Different signs of the pre-emphasis values lead to a changed OFDM symbol waveform, and the pre-emphasis values having the same signs cause a single strong peak at a middle of the OFDM symbol waveform.

The OFDM symbol diagram of FIG. 5b shows null values at 20 ps and 60 ps and a peak power spread at adjacent 10 ps. An optimized pre-emphasis value decreases nonlinearity impairment.

A lower graph of FIG. 5b represents an optical OFDM symbol de-multiplexed by the forward DFT device 710 in the receiver 700.

Referring to the lower graph of FIG. 5b, clear eye-openings appear within a symbol period, and are closed within the narrow time window of 10 ps.

The forward DFT in the receiver 700 may be configured as shown in FIG. 3b.

Figure 5C:
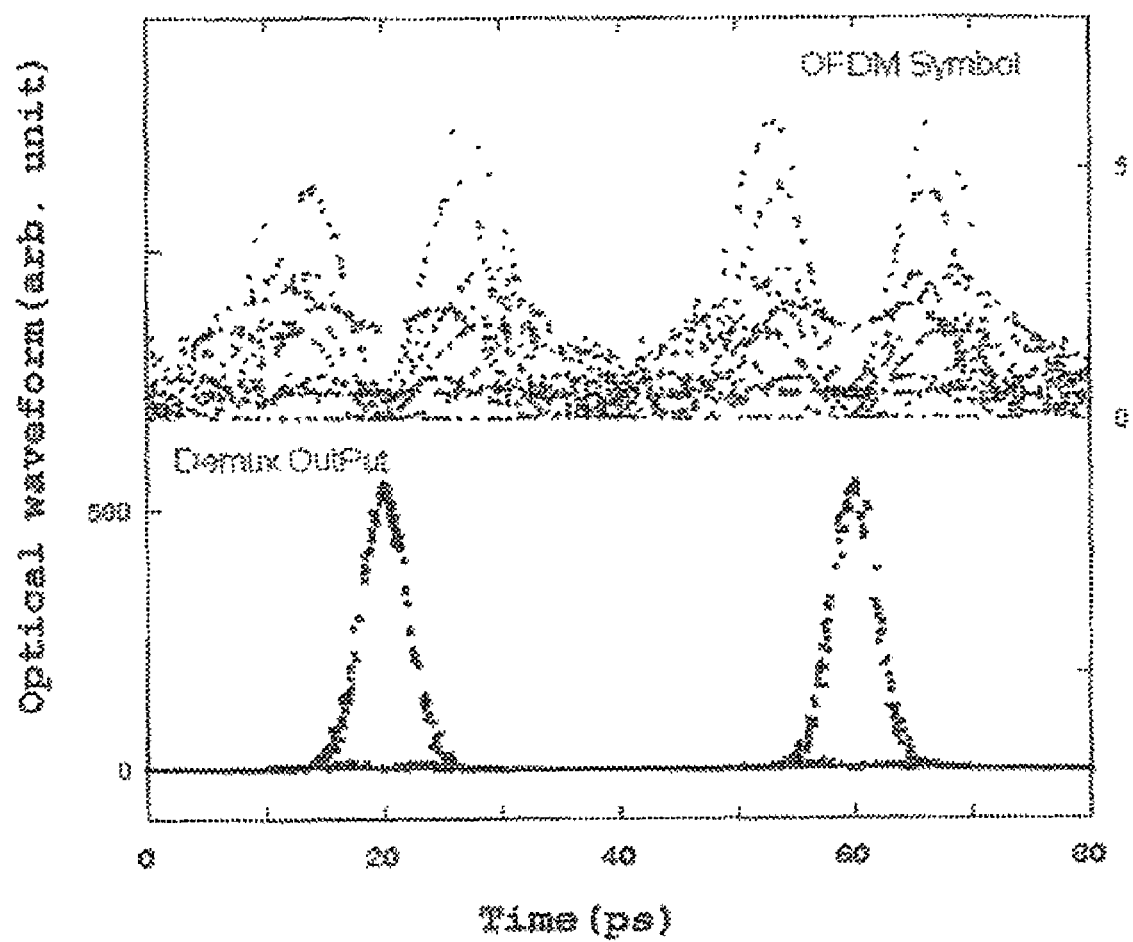
FIG. 5c is a graph showing an optical waveform in an optical OFDM transmission system according to an exemplary embodiment of the present invention.

FIG. 5c is a graph showing an optical OFDM symbol de-multiplexed by the forward DFT device configured as in FIG. 3b according to an exemplary embodiment of the present invention.

Referring to FIG. 5c, an upper waveform represents an optical OFDM symbol output from the Inverse DFT device 640 and has the same features as shown in FIG. 5a.

Referring to a lower graph of FIG. 5c, optical OFDM symbols are detected at 20 ps and 60 ps. The detector in the forward FDT device of FIG. 3b detects the optical OFDM symbols.

In the forward DFT device 710, time domain waveforms have meaningful values only at sampling points. The values are used on all subcarrier outputs so that electro-absorption modulator pulse carvers with repetition at 25 GHz, i.e., the pulse carvers 720a to 720d convert the waveform into return to zero (RZ).

A width of the pulse carvers 720a to 720d is 8.5 ps. RZ optical data is converted into electrical data by the photodiodes 730a to 730d having a 18 GHz 3 dB bandwidth. The electronic components used in this application have a bandwidth less than 25 GHz.

Figure 6A:
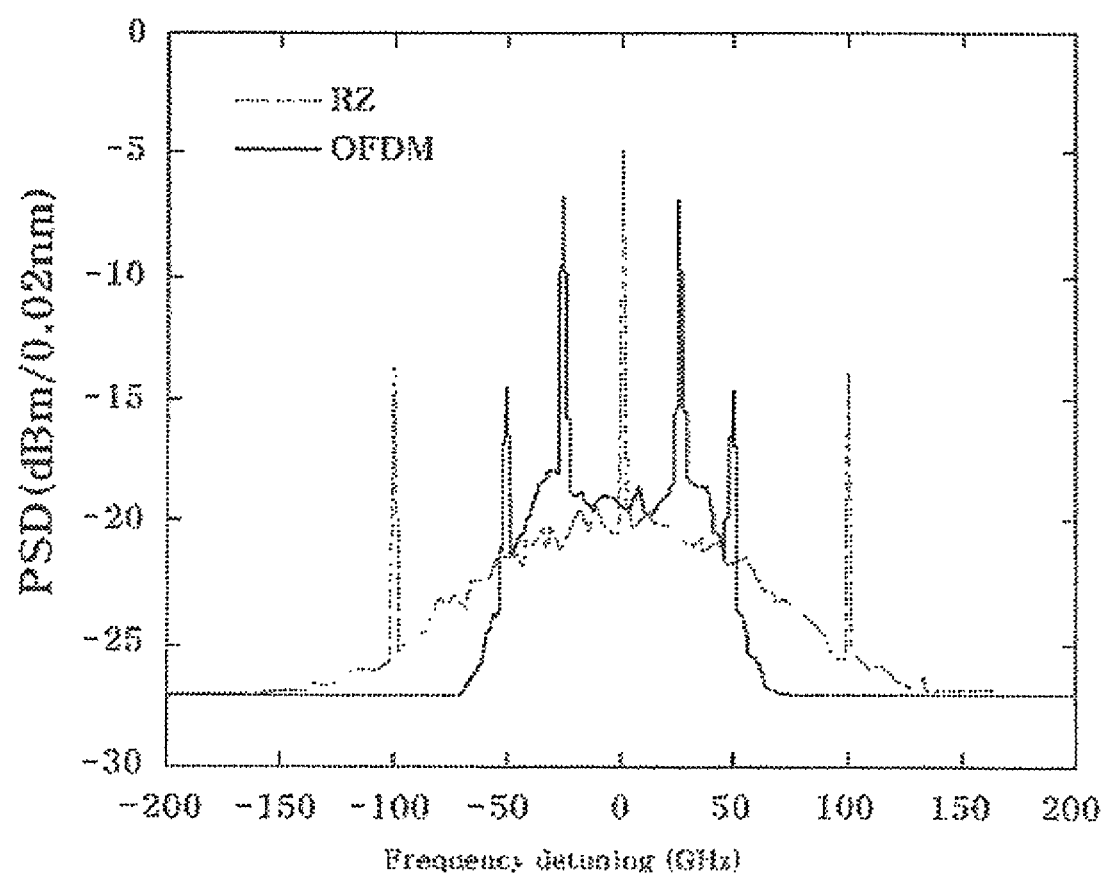
FIG. 6a is a graph showing a comparison of power spectral densities of a 4×25 Gbps optical OFDM transmission system according to an exemplary embodiment of the present invention and a single channel 100 Gbps RZ system.

FIG. 6a is a graph showing a comparison of power spectral densities of the 4×25 Gbps optical OFDM transmission system according to an exemplary embodiment of the present invention and a single channel 100 Gbps RZ system. A PSD spectrum of OFDM transmission using pre-emphasis has a relatively flat slope, which is sharply reduced at about 50 GHz. The data spectrum of RZ transmission having a duty ratio of about 30% is fluently reduced and extends exceeding 50 GHz.

Referring to FIG. 6a, optical OFDM transmission has a double or more spectral efficiency. An amplified spontaneous emission (ASE) value corresponding to 0.1 nm resolution and 20 dB optical signal to noise ratio was used as the spectrum data.

Figure 6B:
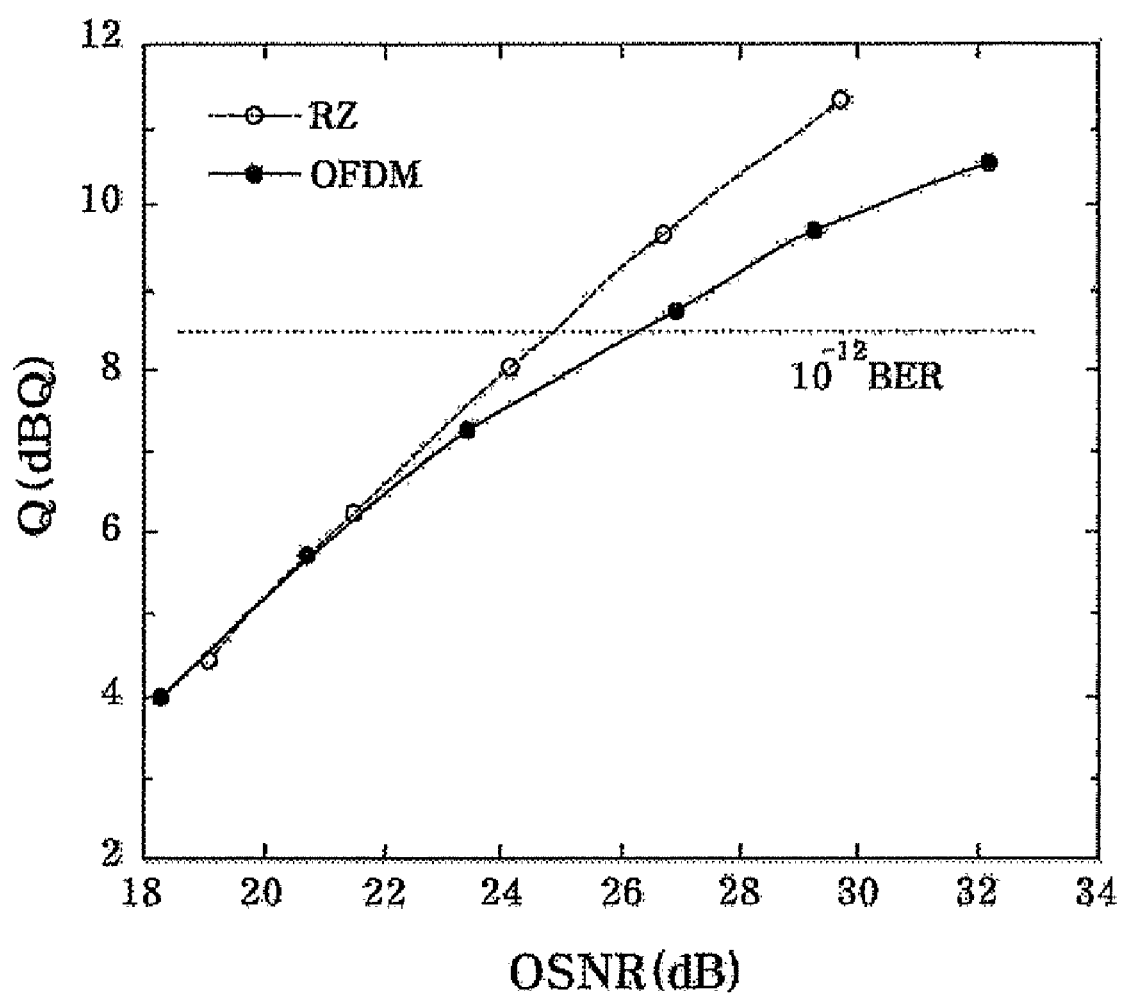
FIG. 6b is a graph showing a comparison of Q factor performance vs. OSNR of a 4×25 Gbps optical OFDM transmission system according to an exemplary embodiment of the present invention and a single channel 100 Gbps RZ system.

FIG. 6b is a graph showing a comparison of Q factor performance vs. OSNR of a 4×25 Gbps optical OFDM transmission system according to an exemplary embodiment of the present invention and a single channel 100 Gbps RZ system.

Referring to FIG. 6b, both the OFDM and RZ transmissions exhibit similar performance at a lower OSNR limit called an "OSNR-limited performance regime." When impact from amplified spontaneous emission is less, crosstalk penalty between OFDM subcarriers becomes obvious over the same single channel RZ transmission. For a Q factor of 8.5 dB, the optical OFDM has 1.4 dB OSNR penalty. As more adjacent subcarriers disappear, the penalty decreases.

It will be apparent to those skilled in the art that various modifications can be made to the above-described exemplary embodiments of the present invention without departing from the spirit or scope of the invention. Thus, it is intended that the present invention cover all such modifications provided they come within the scope of the appended claims and their equivalents.

What is claimed is:

1. A transmitting and receiving apparatus for optical data communication in an optical OFDM system, the apparatus comprising:
   a first pulse carver for outputting optical data having a specific optical spectrum and pulse width;
   a 1:N splitter for splitting the optical data output from the first pulse carver into N optical data;
   N modulators for modulating the optical data from the 1:N splitter by loading the optical data on subcarriers;
   an inverse-discrete Fourier transform device for optically performing inverse-discrete Fourier transform on subcarrier optical data from the modulators to produce optical OFDM symbols;
   a forward discrete Fourier transform device for optically performing discrete Fourier transform on the optical OFDM symbols produced by the inverse-discrete Fourier transform device to demultiplex the symbols;
   N second pulse carvers for receiving the demultiplexed optical OFDM symbols from the forward discrete Fourier transform device and outputting optical data having a specific optical spectrum and pulse width in parallel;
   N photodiodes for converting the optical data output in parallel from the second pulse carvers into electric data; and
   a serializer for receiving the parallel electric data from the photodiodes and converting the parallel electric data into single serial data.

2. The apparatus of claim 1, further comprising: a deserializer for receiving a serially input optical OFDM modulation signal, converting the optical OFDM modulation signal into parallel signals, and outputting the parallel signals to each modulator.

3. The apparatus of claim 1, further comprising: a pre-emphasis control module connected between the 1:N splitter and each modulator for differently adjusting phases and amplitudes of the subcarriers to equalize performance of the subcarriers.

4. The apparatus of claim 1, further comprising: an optical bandpass filter connected between the inverse-discrete Fourier transform device and the forward discrete Fourier transform device for removing an unnecessary spectrum from the optical OFDM symbols produced by the inverse-discrete Fourier transform device.

5. The apparatus of claim 1, wherein the spectrum of the pulse output from the first and second pulse carvers has a Gaussian shape.

6. The apparatus of claim 1, wherein the inverse-discrete Fourier transform device comprises:
   N 1:N splitters for splitting subcarrier signals received from N inputs corresponding to the number of optical frequencies of subcarriers;
   a phase shift delay array module for shifting phases of the split signals from the 1:N splitters;
   N N:1 power couplers for coupling signals output from the phase shift delay array module;

a time delay array module for performing time delay on optical OFDM symbols from the N:1 power couplers; and an N:1 power coupler for coupling signals output from the time delay array module.

7. The apparatus of claim 1, wherein the forward discrete Fourier transform device comprises:

a 1:N splitter for splitting an input optical OFDM symbol into N signals;

a time delay array module for performing time delay on the signals from the 1:N splitter;

N 1:N splitters for splitting signals output from the time delay array module;

a phase shift delay array module for shifting phases of split signals from the 1:N splitters; and N N:1 power couplers for coupling signals output from the phase shift delay array module.

* * * * *